United States Patent

Wedde et al.

[11] Patent Number: 6,140,733
[45] Date of Patent: Oct. 31, 2000

[54] CONDUCTOR WINDING CONFIGURATION FOR A LARGE ELECTRICAL MACHINE

[75] Inventors: Gerhard Wedde, Mülheim an der Ruhr; Ingo Thiemann, Bottrop; Michael Schulten, Bochum, all of Germany

[73] Assignee: Siemens Aktiengesellschaft, Munich, Germany

[21] Appl. No.: 09/192,752

[22] Filed: Nov. 16, 1998

Related U.S. Application Data

[63] Continuation of application No. PCT/DE97/00894, Apr. 30, 1997.

[30] Foreign Application Priority Data

May 15, 1996 [DE] Germany .......................... 196 19 724

[51] Int. Cl.[7] .............................. H02K 1/00; H02K 3/34
[52] U.S. Cl. ............................................ 310/196; 310/215
[58] Field of Search ................................... 310/214, 215, 310/196, 201, 45; 174/140 CR, 148, 127; 336/70

[56] References Cited

U.S. PATENT DOCUMENTS

| | | | |
|---|---|---|---|
| 2,412,851 | 12/1946 | Wiesman | 171/252 |
| 4,274,025 | 6/1981 | Nerurkar et al. | 310/215 |

FOREIGN PATENT DOCUMENTS

| | | |
|---|---|---|
| 36 36 008 A1 | 6/1987 | Germany . |
| 42 19 064 A1 | 12/1993 | Germany . |

OTHER PUBLICATIONS

Patent Abstracts of Japan No. 59–117435 (Matsutaro), dated Jul. 6, 1984.
Patent Abstracts of Japan No. 02–156605 (Hideo et al.), dated Jun. 15, 1990.
International Publication No. WO 91/01059 (Wichman), dated Jan. 24, 1991.
International Publication No. WO 93/06646 (Von Musil et al.), dated Apr. 1, 1993.

Primary Examiner—Nestor Ramirez
Assistant Examiner—Dang Dinh Le
Attorney, Agent, or Firm—Herbert L. Lerner; Laurence A. Greenberg; Werner H. Stemer

[57] ABSTRACT

A conductor winding configuration for a large electrical machine has a supporting body and at least one winding element. The at least one winding element is inserted into an associated slot in the supporting body and has at least one electrical conductor. The at least one electrical conductor is sheathed by insulation which, for its part, is surrounded by a first protective layer. The first protective layer is in turn surrounded by a second protective layer. The protective layers rest against one another with surfaces that ensure free movement of the protective layers against one another.

18 Claims, 2 Drawing Sheets

CONDUCTOR WINDING CONFIGURATION FOR A LARGE ELECTRICAL MACHINE

CROSS-REFERENCE TO RELATED APPLICATION

This application is a continuation of copending International Application No. PCT/DE97/00894, filed on Apr. 30, 1997, which designated the United States.

BACKGROUND OF THE INVENTION

Field of the Invention

The invention relates to a conductor winding configuration for a large electrical machine. The conductor winding configuration can be impregnated with a filler and has a supporting body and at least one winding element which contains at least one electrical conductor which is sheathed by insulation which, for its part, is surrounded by a protective layer.

International Patent Applications WO 91/01059 A1 and WO 93/06646 A1 each disclose a conductor winding configuration for a large electrical machine having a ferromagnetic and electrically conductive supporting body and winding elements. The conductor winding configuration is intended in particular for use in a large electrical machine having an electrical rated consumption or emission of more than about 20 MVA. A winding element that is present in such a configuration has a base body with at least one electrically highly conductive metal wire or metal bar, in particular having a multiplicity of such metal bars. The base body is surrounded by insulation that is sheathed by an electrically semiconductive protective layer. The insulation is composed of a material which can be impregnated or which is impregnated with a filler, contains mica and is normally a strip wound on the base body and on a fine mica base. The filler is a synthetic resin, preferably a heat-curable epoxy resin system, for example a heat-curable mixture of an epoxy resin and an acid anhydride. A base body of a winding element is configured in the form of a bar, in particular roughly straight with bent ends, and has a molded coil composed of wires wound on it. During the course of the so-called total impregnation method, the supporting body with the winding elements, which have wound around them unimpregnated insulation which can be impregnated, is initially completely assembled without any prior filler impregnation, and is subsequently impregnated as an entity. A low-viscosity filler is used for this purpose which fills every gap remaining in the configuration during impregnation, which is carried out under pressure. After curing, the conductor winding configuration is a single, compact solid body. A totally impregnated conductor winding configuration ensures excellent electrical characteristics, in particular high dielectric quality. Furthermore, the cured filler can contribute to the fixing of the winding elements in the slots, so that the requirement for slot sealing means is, under some circumstances, considerably reduced.

In the case of an impregnated winding element inserted in a slot in a supporting body, it is known from the above documents that temperature changes between normal ambient temperatures and considerably more than 100° C. can occur even during the impregnation with filler and the subsequent curing of the filler, as well as during subsequent operation in a large electrical machine. Since the thermal coefficients of expansion of the supporting body and the filler differ from one another, thermal stresses can occur, which lead to the formation of cracks. Such cracks or gaps can, on the one hand, adversely affect the strength of the entire winding and, on the other hand, corona discharges can occur in the gaps during operation of the large electrical machine which not only adversely affect the quality of the dielectrics, but also lead to damage to the insulation over the course of time. In order to prevent such damage, International Patent Application WO 91/01059 A1 provides for a separating layer to be inserted between the slightly electrically conductive protective layer which sheaths the insulation and a further semiconductive protective layer. The separating layer results in the adhesion between the two slightly electrically conductive protective layers being reduced by the filler. The separating layer may be combined with the material of either the one or the other slightly conductive layer. The separating layer contains a separating means, which is not wetted by the filler. If synthetic resin is used as the filler, for example, the separating means is preferably an oily or fatty substance, polytetrafluoroethylene, a silicone compound or the like. The separating means is in this case added to a suitable medium, for example a textile or a film, it being possible for the latter to be made electrically semiconductive by suitable additives. Inserting the separating layer between two electrically semiconductive layers results in an electrically screened zone whose mechanical strength is less than that of the other zones of the winding element inserted in the slot. Cracks in the filler that are caused, for example, by thermal expansion and shrinkage processes preferably occur in this zone of reduced strength. The zone which deliberately has a tendency to crack formation (weak point) is well defined and no significant electrical potential gradients occur in it, so that spark formation in the cracks is virtually precluded, and there is no adverse effect on the electrical quality of the configuration.

A corona-discharge protection configuration for the stator winding of an electrical machine is disclosed in Published, Non-Prosecuted German Patent Application DE 42 19 064 A1. The corona-discharge protection configuration in this case includes two conductive layers located one above the other. The first layer being completely impregnated with an impregnation varnish to form main insulation, and adhering well to the main insulation. In contrast, the second layer is treated with an agent that repels the impregnation varnish, such that the second layer adheres neither to the first layer nor to the slot walls. This results in two conductive layers being produced which are parallel to one another and between which any separation resulting from thermal expansion can occur.

Published, Non-Prosecuted German Patent Application DE 36 36 008 A1 discloses an electrical machine having a stator winding which is produced using the total impregnation technique and has conductor elements which are insulated from one another and are combined to form winding bars. The conductor elements are disposed, surrounded by insulation, in slots in the laminated stator core, and are fixed in the radial direction by slot wedges. Any movement of the winding bars in the radial direction is prevented by the slot wedges being firmly bonded to the laminated stator core by an impregnation varnish. This solves the problem on which the German Patent Application DE 36 36 008 A1 is based, and which consists in that major expansion differences between the main insulation and the stator laminates occur when the electrical machine is heated or cooled, which expansion differences cannot be absorbed by the bonding points, so that local cracks and holes occur. In the case of high-rated machines, current forces which act mainly in the radial direction also occur in the conductors and in the slots in the laminated stack, so that, after initial loosening, these laminates can vibrate at twice the mains frequency. This could result in mechanical destruction of the main insulation and, finally, in failure of the electrical machine. The winding bars are surrounded on all sides by a sliding coating that, after impregnation and curing of the impregnation varnish introduced during the total impregnation method, has no adhesive connection to the main insulation. The sliding coating is composed of felt or fabric in the form of strips or webs, which is impregnated with a resin which contains conductive fillers, for example graphite powder, in order to achieve the necessary electrical conductivity of the sliding coating. Corona discharges are prevented by outer or slot corona-discharge protection, which may have to be provided, and around which the sliding coating is disposed. The conductivity of the sliding coating is such that a surface resistance in the order of magnitude of 1 kohm to 25 kohm per unit area is achieved. The sliding coating is manufactured from a glass-fiber felt or fabric that is impregnated with silicone resin, to which the conductive fillers are added.

Since the impregnation varnish is manufactured from an epoxy resin or polyester resin, bonding with the main insulation should be prevented, because of the different impregnation resin base of the sliding coating.

As a result of the fact that no adhesion takes place between the sliding coating and the main insulation, the winding bars can expand freely in the axial direction in the slot.

SUMMARY OF THE INVENTION

It is accordingly an object of the invention to provide a conductor winding configuration for a large electrical machine which overcomes the above-mentioned disadvantages of the prior art devices of this general type, which has at least one electrical conductor which can be removed easily, particularly in the event of the conductor winding configuration being repaired.

With the foregoing and other objects in view there is provided, in accordance with the invention, a conductor winding configuration for a large electrical machine, including: a supporting body having a slot formed therein; and at least one winding element inserted into the slot of the supporting body, the at least one winding element having: at least one electrical conductor; insulation sheathing the at least one electrical conductor; a first protective layer surrounding the insulation and having an outer non-stick surface; and a second protective layer having an inner non-stick surface immediately adjacent to and surrounding the outer non-stick surface of the first protective layer, the inner non-stick surface resting against the outer non-stick surface substantially without any adhesion.

According to the invention, the object is achieved in the case of a conductor winding configuration in that the electrical conductor is sheathed by insulation which, for its part, is surrounded by a first protective layer which is in turn surrounded by a second protective layer. The mutually facing surfaces of the protective layers are constructed as non-stick surfaces which abut against one another essentially without any adhesion, that is to say with a low level of frictional resistance. The insulation may be high-voltage insulation.

As a result of the low level of adhesion of the surfaces to one another, which is still maintained even in the event of complete impregnation of the conductor winding configuration with a filler, the electrical conductor can easily be removed, with the insulation and the first protective layer surrounding it, from the conductor winding configuration, particularly in the event of repair. The wound electrical conductor can therefore, in particular, be removed easily from the conductor winding configuration, since the frictional resistance between the two mutually adjacent non-stick surfaces is so low that the static friction and sliding friction between the protective layers is sufficiently low even in the case of electrical conductors having a length of several meters. Separating layers and sliding coatings according to the prior art are, in contrast, always adjacent to a surface having increased frictional resistance and adhere to such a surface at least in places, as a result of which the tension forces required to remove the electrical conductor are very high. It is furthermore advantageous that the protective layers have a smaller layer thickness than known protective layers, in particular outer corona-discharge protection configurations, which ensure improved heat transfer through the protective layers. Even if the slots in the known supporting bodies are of the same width, this allows insulation, in particular high-voltage insulation, to be constructed with a greater layer thickness, so that insulation with improved thermal conductivity can be used. Insulation composed of thermally conductive fine-mica glass-fiber strips is suitable, for example, for this purpose.

The two protective layers are preferably both slightly electrically conductive and form outer corona-discharge protection for the insulation. In this context, slightly electrically conductive means that the surface resistivity of each protective layer is in a range between 2 kohm and 100 kohm, preferably between 30 kohm and 50 kohm. This ensures adequate potential control, and avoids corona discharges occurring.

Each protective layer preferably has a layer thickness of 50 $\mu$m to 150 $\mu$m, and in particular 100 $\mu$m. Therefore, the total layer thickness of outer corona-discharge protection formed by the protective layers is reduced to 0.1 mm to 0.3 mm. Such a small layer thickness ensures good heat transfer between the electrical conductor, in particular a copper solid body in the form of a bar, and the supporting body, composed of a laminated stack. This also leads to a reduction in the thermal stress on the conductor winding configuration, which contribute to an increased life span.

The first protective layer is preferably composed of one strip or a plurality of strips, which are wound around the insulation in one layer. The strip is preferably of felt that can be impregnated and is coated or impregnated with a corresponding non-stick material in order to produce the non-stick surface. This results in the protective layer being able to withstand temperatures up to more than 180° C., as a result of which a conductor winding configuration formed in this way is suitable even for use in gas-cooled turbogenerators having ratings up to more than 400 MVA and which are cooled in particular by air or hydrogen. The nonstick surface of the strip is preferably opposite an adhering surface, which has a greater coefficient of friction. When the electrical conductor is removed from the conductor winding configuration, this ensures that the second protective layer remains in the slot, while the first protective layer can be pulled out of the conductor winding configuration, virtually without any friction, together with the electrical conductor. The strip, which in particular is electrically slightly conductive, is preferably wound onto the insulation in a semi-overlapping manner. The fact that the strip overlaps itself only partially results in its adhering surface being in continuous frictional contact with the insulation. In consequence, the strip is virtually immovable with respect to the insulation, so that it remains around the insulation even during removal of the electrical conductor.

Additional attachment of the strip to the insulation is achieved in that at least the adhering surface, even if it is not a majority of the protective layer, can be bonded to the insulation by a filler which impregnates the conductor winding configuration. The filler is preferably an epoxy resin. Any suitable materials can, of course be used for the filler, provided they have the required viscosity, appropriate thermomechanical long-term resistance and an appropriate electrical insulation capability, in particular for total impregnation.

The second protective layer is preferably likewise a strip, which is wound around the first protective layer. The strip can be constructed in the same way as the strip already described for the first protective layer. The respective non-stick surfaces of the strips having the low coefficients of friction being adjacent to one another.

Alternatively, the second protective layer can also be disposed on a wall of the slot, in particular completely lining the slot. In this case, the second protective layer is not additionally wound around the electrical conductor, which results in the space requirement per electrical conductor possibly being reduced. For a given load level, this makes it possible either to construct the conductor winding configuration to be particularly compact or else, to configure it with regard to other aspects, for example in terms of the operation of the large electrical machine. Insulation with improved thermal conductivity for the same slot size can also be achieved in this way.

The first protective layer and/or the second protective layer has or have a separating means at least on the non-stick surface, for example silicone resin, polytetrafluoroethylene or the like, which can largely not be bonded by an impregnation resin, in particular an epoxy resin. Such separating means which cannot be bonded are disclosed, for example, in Published, Non-Prosecuted German Patent Application DE 36 36 008 A1. The filler is preferably an impregnation resin, for example a curable synthetic resin, with which the conductor winding configuration is impregnated. Suitable fillers include all those materials which, in accordance with the requirements for the large electrical machine, have an adequate insulation capability, low viscosity and adequate thermomechnnical long-term resistance.

The conductor winding configuration is preferably suitable for use in a stator or a rotor of a large electrical machine, in particular a turbogenerator, having an electrical consumption or emission rating of more than 20 MVA.

Other features which are considered as characteristic for the invention are set forth in the appended claims.

Although the invention is illustrated and described herein as embodied in a conductor winding configuration for a large electrical machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
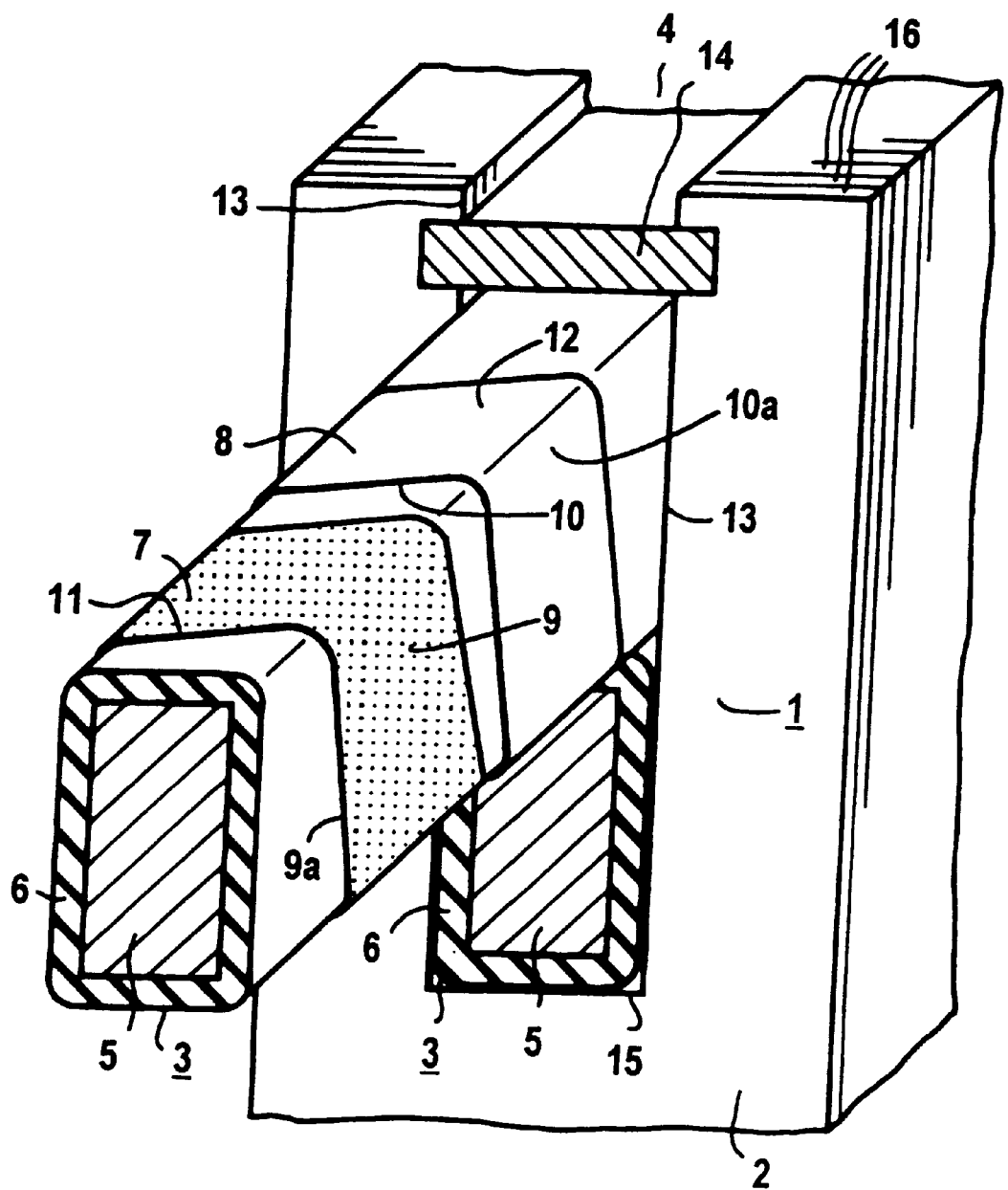
FIG. 1 is a fragmentary, partially broken away, perspective view of winding elements disposed in a supporting body according to the invention.

In all the figures of the drawing, sub-features and integral parts that correspond to one another bear the same reference symbol in each case. Referring now to the figures of the drawing in detail and first, particularly, to FIG. 1 thereof, there is shown a detail of a conductor winding configuration 1 having a ferromagnetic and electrically conductive supporting body 2. The supporting body 2 is formed from stator laminates 16 disposed in layers one on top of the other. The conductor winding configuration 1 has two winding elements 3 that are inserted into a slot 4 formed in the supporting body 2. The slot 4 is sealed by a slot sealing means 14. Each of the winding elements 3 has an electrical conductor 5 that is surrounded by high-voltage insulation 6. The non-structured electrical conductor 5 is illustrated in each winding element 3. The conductor 5 may, particularly for a large dynamo-electrical machine, contain a multiplicity of metal bare or metal wires some of which may possibly be hollow in order to carry a cooling fluid, such as air, hydrogen or water for example, as is illustrated by way of example in Published, Non-Prosecuted German Patent Application DE 36 36 008 A1. The insulation 6 has an electrically slightly conductive strip 11 wound around it, which at least partially overlaps itself. The strip 11 forms a first protective layer 7, which is part of outer corona-discharge protection in order to prevent corona discharges. The strip 11 has an adhering surface 9a, which faces the insulation 6 and produces adhesion between the insulation 6 and the first protective layer 7. Opposite the adhering surface 9a, the strip 11 has a non-stick surface 9, which has a low coefficient of friction and cannot be bonded, by a filler, for example an epoxy resin, i.e. it is non-impregnable by the resin. The strip 11, at least the non-stick surface 9, for this purpose has in particular a separating means which cannot be bonded to the filler, for example a silicone resin or polytetrafluoroethylene. Wound around the first protective layer 7 there is a further strip 12 having an adhering surface 10a and a non-stick surface 10 opposite it. The further strip 12 is a second protective layer 8, which surrounds the insulation 6. The further strip 12 is in this case wound such that the non-stick surface 10 rests against the non-stick surface 9 of the strip 11. The adhering surface 10a of the further strip 12 rests against a wall 13 and/or a slot base 15 of the slot 4, and can be bonded thereto by a filler. The further strip 12 is likewise slightly electrically conductive and forms an electrically slightly conductive bridge between the first protective layer 7 and the supporting body 2 which is, in particular, a stator of a large electrical machine. Even while the conductor winding configuration 1 is being impregnated with a filler, in particular an epoxy resin, during which process all the remaining cavities in the slot 4 as well as the high-voltage insulation 6, which can be impregnated, are filled or impregnated with the filler, the mutually associated nonstick surfaces 9, 10 are resting against one another virtually without any adhesion. This ensures that, when the conductor winding configuration 1 is completely impregnated, the electrical conductor 5 can be pulled out easily and simply, with the insulation 6 and the first protective layer 7. This is achieved in particular as a result of the fact that only small adhesion forces or other mechanical bonds exist between the protective layers 7, 8, so that the protective layers 7, 8 slide against one another virtually without any friction.

Figure 2:
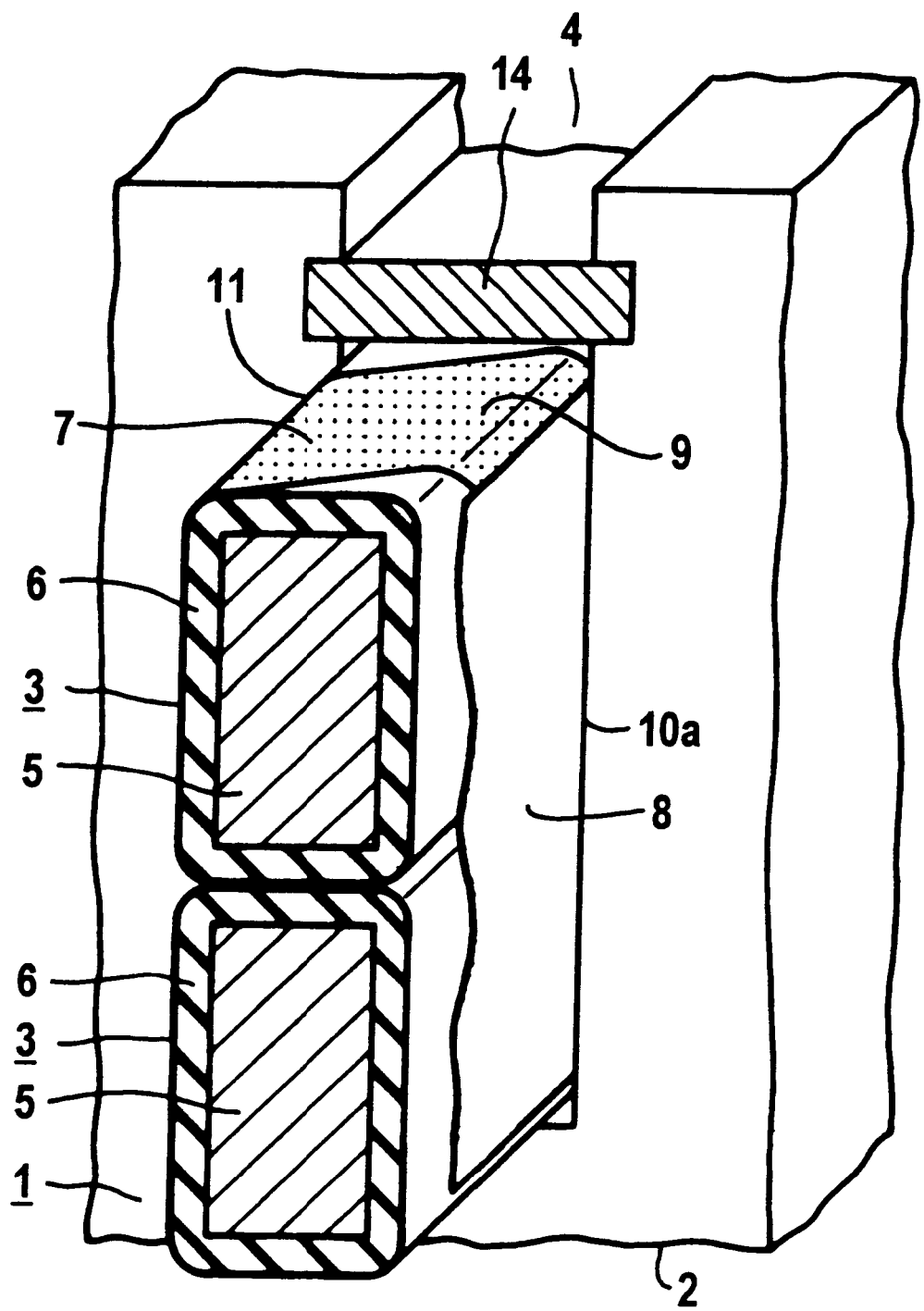
FIG. 2 is a fragmentary, partially broken away, perspective view of the winding elements disposed in the supporting body.

FIG. 2 illustrates a conductor winding configuration 1 which is constructed analogously to FIG. 1, insofar as reference is made to the explanation relating to FIG. 1, an alternative version of the second protective layer 8 is illustrated. The second protective layer 8, which once again has a non-stick surface 10 which faces a corresponding non-stick surface 9 on the first protective layer 7, is located, without having to be wound around the electrical conductor 5, between a wall 13 of the slot 4 and/or a slot base 15 and the illustrated electrical conductors 5. The second protective layer 8 is virtually a complete lining for the slot 4. The adhering surface 10a once again faces the slot wall 15, so that adhesion or bonding of the second protective layer 8 to the supporting body 2 is ensured. Virtually free movement between the electrical conductors 5 and the supporting body 2 is thus provided in the axial direction of the electrical conductor 5 as well. This is advantageous, particularly if it is necessary to remove the electrical conductors 5 from the slot 4 for a repair.

The conductor winding configuration 1 according to the invention and composed of, in particular, the ferromagnetic and electrically conductive supporting body 2 and the winding elements 3 of any configuration is matched in a particular manner to the requirements of the total impregnation method for producing a component for a large electrical machine, in particular a stator, both with respect to the production costs involved and with respect to the operating loads. The invention is distinguished by the fact that the outer corona-discharge protection of insulation 6 surrounding the electrical conductor 5 is formed of two protective layers 7,8, both of which are slightly electrically conductive. Through electrically conductive bridges, the protective layers 7, 8 reduce the potential difference between the insulation and the supporting body. The protective layers 7, 8 are largely movable freely, in particular without any friction, with respect to one another in the axial direction of the electrical conductor. The ability to move is achieved by the fact that the mutually facing surfaces of the protective layers 7, 8 are non-stick and have a low coefficient of friction. At least in the region of the respective non-stick surfaces, the protective layers 7, 8 cannot be bonded by a filler, in particular an epoxy resin, so that this capability of the protective layers 7, 8 to move freely with respect to one another remains ensured even after impregnation of the electrical conductors in a slot in the supporting body. Furthermore, the outer corona-discharge protection can have a small layer thickness of, for example, less than 0.2 mm as a result of the use of the two protective layers 7, 8, as a result of which the layer thickness of the high-voltage insulation can be correspondingly large for a given slot width. The material used for the insulation 6 may therefore be a thermally conductive fine-mica strip, or a similar thermally conductive material. This results in a conductor winding configuration 1 having particularly high level thermal conductivity, which is associated with an increased electrical consumption or emission rating for a particularly compact construction of a large electrical machine, in particular of a turbogenerator.

We claim:

1. A conductor winding configuration for a large electrical machine, comprising:
    a supporting body having a slot formed therein; and
    at least one winding element inserted into said slot of said supporting body, said at least one winding element including:
        at least one electrical conductor;
        insulation sheathing said at least one electrical conductor;
        a first protective layer surrounding said insulation and having an outer non-stick surface; and
        a second protective layer having an inner non-stick surface immediately adjacent to and surrounding said outer non-stick surface of said first protective layer, said inner non-stick surface resting against said outer non-stick surface substantially without any adhesion, and said inner non-stick surface and said outer non-stick surface being substantially non-impregnable by an impregnating resin.

2. The conductor winding configuration according to claim 1, wherein said first protective layer and said second protective layer are slightly electrically conductive and provide outer corona-discharge protection for said insulation.

3. The conductor winding configuration according to claim 1, wherein said first protective layer and said second protective layer each have a layer thickness of 50 μm to 150 μm.

4. The conductor winding configuration according to claim 1, wherein said first protective layer and said second protective layer each have a layer thickness of 100 μm.

5. The conductor winding configuration according to claim 1, wherein said first protective layer is a strip wound around said insulation, said strip having an inner adhering surface opposite said outer non-stick surface and said inner adhering surface having a greater coefficient of friction than said outer non-stick surface.

6. The conductor winding configuration according to claim 5, wherein said inner adhering surface of said first protective layer can adhere to a filler.

7. The conductor winding configuration according to claim 5, wherein said inner adhering surface of said first protective layer can adhere to an epoxy resin base filler.

8. The conductor winding configuration according to claim 5, wherein said second protective layer is a strip wound around said first protective layer, said strip having an outer adhering surface opposite said inner non-stick surface, and said outer adhering surface having a greater coefficient of friction than said inner non-stick surface.

9. The conductor winding configuration according to claim 8, wherein said outer adhering surface of said second protective layer can adhere to a filler including an epoxy resin base filler.

10. The conductor winding configuration according to claim 8, wherein said strip forming said first protective layer is identical to said strip forming said second protective layer.

11. The conductor winding configuration according to claim 1, wherein said supporting body has a wall defining said slot and said second protective layer disposed on said wall.

12. The conductor winding configuration according to claim 1, wherein at least one of said first protective layer and said second protective layer has a separating means at least on a respective non-stick surface.

13. The conductor winding configuration according to claim 12, wherein said separating means is one of a silicone resin and a polytetrafluoroethylene which can largely not be bonded by an impregnation resin including an epoxy resin.

14. The conductor winding configuration according to claim 1, further comprising a filler including a cured synthetic resin impregnating said supporting body and said at least one winding element.

15. In combination with a large electrical machine, a stator, comprising:
    a supporting body having a slot formed therein; and
    at least one winding element inserted into said slot of said supporting body, said at least one winding element including:
        at least one electrical conductor;
        insulation sheathing said at least one electrical conductor;

a first protective layer surrounding said insulation and having an outer non-stick surface; and a second protective layer having an inner non-stick surface immediately adjacent to and surrounding said outer non-stick surface of said first protective layer, said inner non-stick surface resting against said outer non-stick surface substantially without any adhesion, and said inner non-stick surface and said outer non-stick surface being substantially on-impregnable by an impregnating resin.

16. In combination with a turbogenerator, a stator, comprising:

a supporting body having a slot formed therein; and at least one winding element inserted into said slot of said supporting body, said at least one winding element including:

at least one electrical conductor;

insulation sheathing said at least one electrical conductor;

a first protective layer surrounding said insulation and having an outer non-stick surface; and a second protective layer having an inner non-stick surface immediately adjacent to and surrounding said outer non-stick surface of said first protective layer, said inner non-stick surface resting against said outer non-stick surface substantially without any adhesion, and said inner non-stick surface and said outer non-stick surface being substantially non-impregnable by an impregnating resin.

17. In combination with a large electrical machine, a rotor, comprising:

a supporting body having a slot formed therein; and at least one winding element inserted into said slot of said supporting body, said at least one winding element including:

at least one electrical conductor;

insulation sheathing said at least one electrical conductor;

a first protective layer surrounding said insulation and having an outer non-stick surface; and a second protective layer having an inner non-stick surface immediately adjacent to and surrounding said outer non-stick surface of said first protective layer, said inner non-stick surface resting against said outer non-stick surface substantially without any adhesion, and said inner non-stick surface and said outer non-stick surface being substantially non-impregnable by an impregnating resin.

18. In combination with a turbogenerator, a rotor, comprising:

a supporting body having a slot formed therein; and at least one winding element inserted into said slot of said supporting body, said at least one winding element including:

at least one electrical conductor;

insulation sheathing said at least one electrical conductor;

a first protective layer surrounding said insulation and having an outer non-stick surface; and a second protective layer having an inner non-stick surface immediately adjacent to and surrounding said outer non-stick surface of said first protective layer, said inner non-stick surface resting against said outer non-stick surface substantially without any adhesion, and said inner non-stick surface and said outer non-stick surface being substantially non-impregnable by an impregnating resin.

* * * * *